(12) United States Patent
Mazuz et al.

(10) Patent No.: US 7,505,478 B2
(45) Date of Patent: Mar. 17, 2009

(54) METHOD AND APPARATUS OF DE-MULTIPLEXING DATA

(75) Inventors: Gadi Mazuz, Shoham (IL); Alex Margulis, Ashdod (IL)

(73) Assignee: Marvell International Ltd., Hamilton (BM)

( * ) Notice: Subject to any disclaimer, the term of this patent is extended or adjusted under 35 U.S.C. 154(b) by 1100 days.

(21) Appl. No.: 10/261,677

(22) Filed: Oct. 2, 2002

(65) Prior Publication Data

US 2004/0071167 A1 Apr. 15, 2004

(51) Int. Cl.
*H04L 12/54* (2006.01)
(52) U.S. Cl. .................... 370/429; 370/535; 370/537
(58) Field of Classification Search ............... 370/351, 370/389, 428, 532, 533, 535–537, 539–545, 370/429
See application file for complete search history.

(56) References Cited

U.S. PATENT DOCUMENTS

| 6,356,528 | B1* | 3/2002 | Lundby et al. ............ 370/209 |
| 6,624,767 | B1* | 9/2003 | Shiu et al. .................... 341/81 |
| 6,828,926 | B2* | 12/2004 | Jaffe et al. .................... 341/81 |
| 6,944,729 | B2* | 9/2005 | Woodard ..................... 711/158 |
| 6,985,093 | B2* | 1/2006 | Jaffe et al. .................... 341/50 |
| 6,988,234 | B2* | 1/2006 | Han ............................ 714/755 |
| 7,072,410 | B1* | 7/2006 | Monsen ...................... 375/260 |
| 7,187,708 | B1* | 3/2007 | Shiu et al. ................... 375/148 |
| 7,203,527 | B2* | 4/2007 | Czaja et al. ................. 455/574 |
| 7,227,851 | B1* | 6/2007 | Gopalakrishnan et al. ... 370/335 |
| 7,310,324 | B2* | 12/2007 | T ............................... 370/335 |
| 7,385,949 | B1* | 6/2008 | Botha ......................... 370/329 |
| 7,386,001 | B1* | 6/2008 | Kim et al. ................... 370/442 |

* cited by examiner

*Primary Examiner*—Wing F. Chan
*Assistant Examiner*—Mark A. Mais

(57) ABSTRACT

A method and apparatus to de-multiplex a de-interleaved frame is provided. The method of de-multiplexing may add a de-interleaved address of a symbol of the de-interleaved frame to a base address of the de-interleaved frame to provide a target address. The symbol may be written in a channel buffer according to the target address.

14 Claims, 3 Drawing Sheets

METHOD AND APPARATUS OF DE-MULTIPLEXING DATA

BACKGROUND OF THE INVENTION

In modern wireless communication systems such as cellular communication systems, radio transmitters may transmit interleaved and multiplexed data over transport channels. The interleaved and multiplexed data may be received by radio receivers. The radio receiver may process the received data. All example of a data processing method may be as follows: storing the received multiplexed data at a first temporary memory location, de-interleaving the stored data, storing the de-interleaved data at a second temporary memory location, de-multiplexing the stored data and writing the de-multiplexed data in the radio receiver memory. As is shown in the above example, the radio receiver may need to use at least two temporary memory locations to process the data. Thus, a large memory allocation in order to provide the memory space needed to perform the above described method. Furthermore, the receiver may consume a high current due to data transactions between temporary memories.

Thus, there is a continuing need for better ways to mitigate the above-described disadvantages.

BRIEF DESCRIPTION OF THE DRAWINGS

The subject matter regarded as the invention is particularly pointed out and distinctly claimed in the concluding portion of the specification. Tie invention, however, both as to organization and method of operation, together with objects, features and advantages thereof, may best be understood by reference to the following detailed description when read with the accompanied drawings in which:

Figure 1:
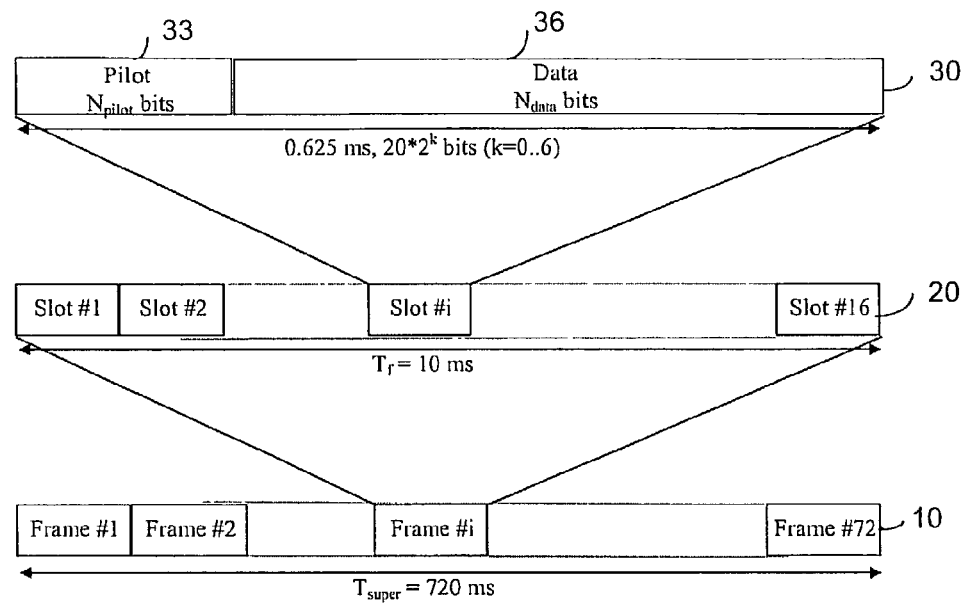
FIG. 1 is an illustration of all example of a frame structure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in variety of applications. Although the present invention is not limited in this respect, the circuits and techniques disclosed herein may be used in many apparatuses such as receivers of a radio system. Receivers intended to be included within the scope of the present invention include, by a way of example only, cellular radiotelephone receivers, two-way radio receivers, digital system receivers, wireless local area network receivers, wideband receivers, ultra wideband receivers, and a like, Type of cellular radiotelephone receivers intended to be within the scope of the present invention include, although not limited to, Code Division Multiple Access (CDMA) and wide band CDMA (W-CDMA) cellular radiotelephone receivers for receiving spread spectrum signals, CDMA-2000 receivers, and the like.

Although the scope of the present invention is not limited in this respect, a cellular communication system, for example WCDMA cellular communication system, may include transport channels that may transport data from a base station to a mobile station. For example, FIG. 1 shows content of data that may be transmitted over the transport channel, although the scope of the present invention is not limited in this respect.

In this example, data stream 10 may include 72 frames. A frame 20 may be 10 milliseconds (ms) long and may include 16 slots. A slot 30 may include data 36 of a pilot channel 33. Although it should be understood by one skilled in the art, data stream 10 may be represented in symbols. It should be understood by one skilled in the art that symbols may be a product of modulating the symbol duration of data 10 with a pseudo-random binary sequence. The symbol duration may be dependent on the spreading factor. Furthermore, the symbol may represent specific information and may include one or more bits, if desired.

Although the scope of the present invention is not limited in this respect, the frames may be interleaved before they are transmitted. Interleaving of data may be done by rearranging the content of the frames. In addition, the slots may be interleaved in substantially the same manner as the frames were interleaved.

Figure 2:
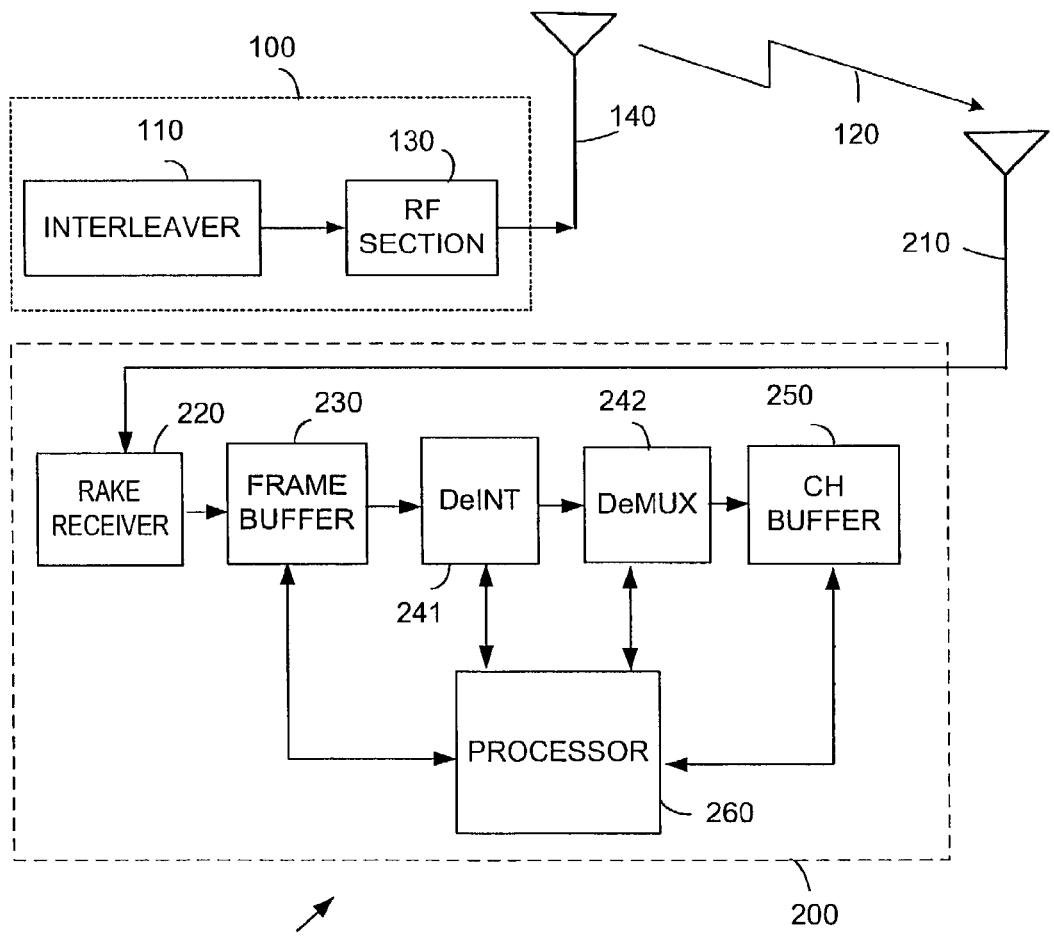
FIG. 2 is a block diagram of a receiver according to an embodiment of the present invention.

Turning to FIG. 2, all example of a wireless communication system 1000 in accordance with an embodiment of the present invention is shown. Although the scope of the present invention is not limited in this respect, wireless communication system 1000 may be a CDMA or WCDMA cellular communication system, and the like. Furthermore, wireless communication system 1000 may include a transmitter 100 and a receiver 200. For example, transmitter 100 may be a transmitter of a base station and receiver 200 may be a receiver a mobile station.

In at least one embodiment of the present invention, although the scope of the present invention is not limited in this respect, transmitter 100 may include an interleaver 110 that may interleave data before it is transmitted over at least one transport channel 120, if desired. Furthermore, transmitter 100 may include a radio frequency (RF) section 130 and may be coupled to an antenna 140 to transmit the interleaved data over the transport channel 120, if desired.

Although the scope of the present invention is not limited to this particular embodiment, the receiver 200 may be a WCDMA receiver, and the like. The receiver 200 may be coupled to an antenna 210 a rake receiver 220, a frame buffer 230, a de-interleaver 241, a de-multiplexer 242, a channel buffer 250 and a processor 260. However, in alternative embodiments of the present invention, de-interleaver 241 and de-multiplexer 242 may be combined.

Although the scope of the present invention is not limited in this respect, receiver 200 may receive data from transmitter 100 over at least one of the transport channels, for example transport channel 120. The received data may include interleaved data. Receiver 200 may receive data through antenna 210. Although the scope of the present invention is not limited in this respect, types of antenna that may be used may include a dipole antenna, a one-pole antenna, a shot antenna, and the like.

In addition, rake receiver 220 may receive the data and may provide interleaved frames that may be stored in frame buffer 230. Although the scope of the present invention is not limited in this respect, in some embodiments of the present invention rake receiver 230 may be include one or more rake receivers. For example, rake receiver 230 may be CDMA rake receiver or a WCDMA rake receiver and may be implemented by hardware and/or software, if desired. Furthermore, in some embodiments of the present invention, frame buffer 230 may store at least one frame provided by the rake receiver, if desired.

In addition, in some embodiments of the present invention, addresses of frame buffer 230, addresses of channel buffer 250 and addresses of other receiver 200 buffers may be allocated in the memory of receiver 200. In addition, types of memories that may be used by receiver 200, for example, may be a read access memory (RAM), dynamic RAM (DRAM), static RAM (SRAM) and the like.

Although the scope of the present invention is not limited in this respect, frame buffer 230 may provide a frame to de-interleaver 241. De-interleaver 241 may de-interleave the soft symbols and de-multiplexer 242 may de-multiplex the de-interleaved soft symbols. Furthermore, de-interleaving and de-multiplexing may be done according to methods known to the one skilled in the art and may include interleave/de-interleave methods, multiplex/de-multiplex methods that may be used in CDMA, WCDMA, CDMA 2000, UTMS and the like, cellular radio communication system.

Although the scope of the present invention is not limited in this respect, writing a de-multiplexed symbol to channel buffer 250 may be done without storing a de-multiplexed frame in an additional buffer. In addition, it should be understood to one skilled in the art that de-interleaving, de-multiplexing and writing to channel buffer 250 may be consecutive operations.

Although the scope of the present invention is not limited in this respect, processor 260 may receive the de-interleaved symbol from de-interleaver 241 and may decode a de-interleaved address of the de-interleaved symbol. Although the scope of the present invention is not limited in this respect, the de-interleaved address may be the address of the symbol in frame buffer 230. In addition, processor 260 may calculate a target address of the de-multiplexed symbol in channel buffer 250 and may write the de-multiplexed symbol in channel buffer 250. A method of calculating and writing the de-multiplexed symbol in channel buffer 250 will be described in detail with reference to FIG. 4.

In addition, processor 260 may be used to control frame buffer 230, de-interleaver 241, de-multiplexer 242 and channel buffer 250. Furthermore, processor 260 may be, for example, a digital signal processor (DSP), a special purpose processor, and the like, although the scope of the present invention is in no way limited in this respect.

In addition, although the scope of the present invention is not limited in this respect, channel buffer 250 may be divided into two or more logical buffers, for example transport channel buffers, to store the de-multiplexed symbols of transport channels such as for example transport channel 120. Furthermore, the number of the logical buffers that may be included in the channel buffer may be substantially equal to the number of transport channels. Furthermore, in other embodiments of the present invention, the length of channel buffer 250 may be dynamically allocated according to the length of data of the transport channels. In some embodiments of the present invention, the allocation of transport channels buffers in channel buffer 250 may be done by processor 260, if desired. Furthermore, in some embodiments of the invention, channel buffer 250 may physically be one buffer with a common read write port.

Figure 3:
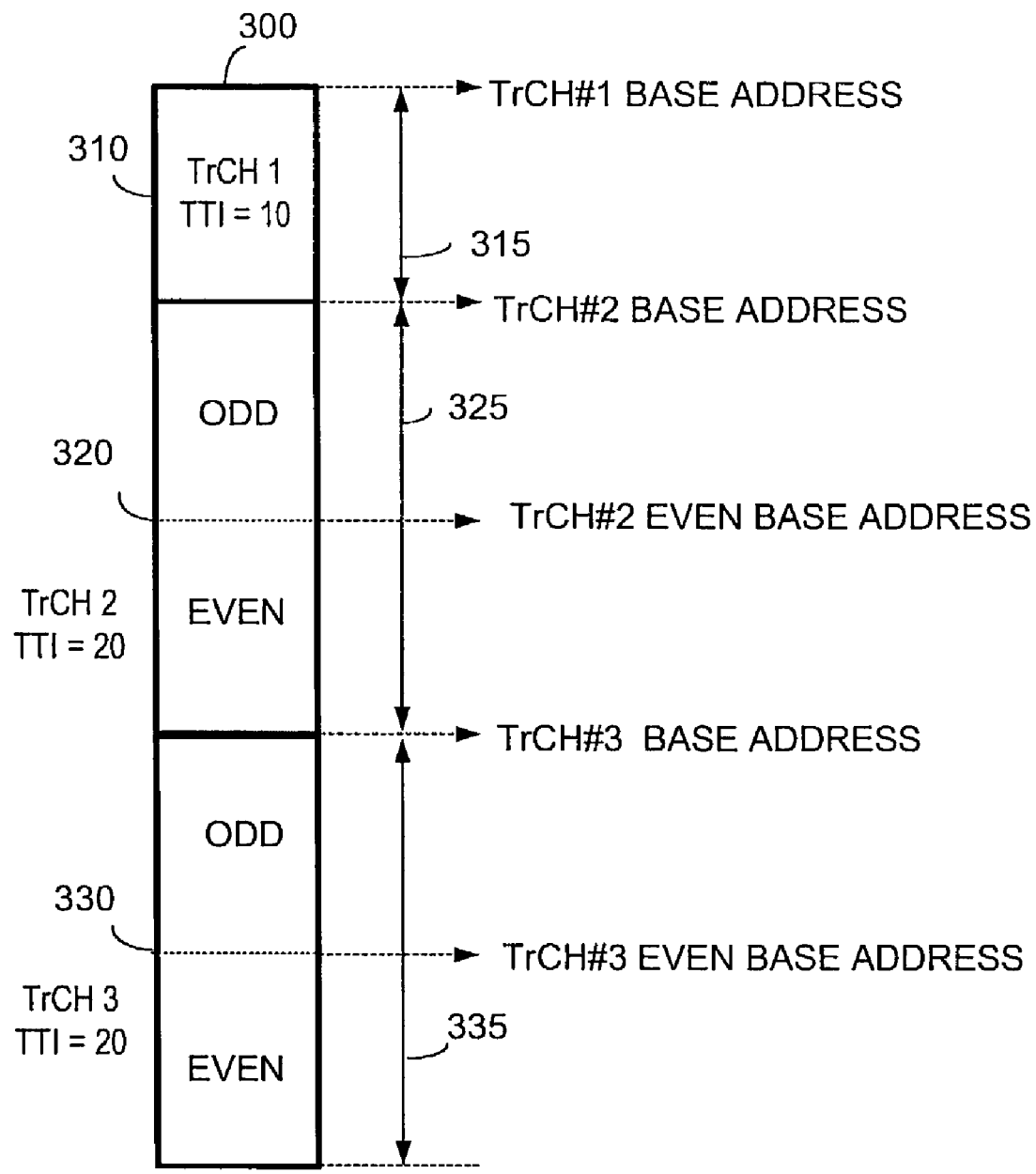
FIG. 3 is a block diagram of a channel buffer according to some embodiments of the present invention.

Turning to FIG. 3, a block diagram of a channel buffer 300 according to some embodiments of the present invention is shown. Although the scope of the present invention is not limited in this respect, channel buffer 300 may include a plurality of transport channel buffers, for example, transport channel buffer 1 (TrCH#1) 310, transport channel buffer 2 (TrCH#2) 320 and transport channel buffer 3 (TrCH#3) 330. The size of a transport channel buffer may provide an indication of the address range of the transport channel buffer and may show the number of addresses. For example, the size of TrCH#1 (marked as 315) may be 50, the size of TrCH#2 (325) may be 70 and the size of TrCH#3 (335) may be 70.

Furthermore, in this example, the time transmit interval (TTI) of TrCH#1 310 may be 10 ms, TTI of TrCH#2 320 may be 20 ms and TTI of TrCH#3 320 may be 20 ms. However, in other embodiments of the present invention the TTI may be 10 ms, 20 ms, 40 ms, 80 ms, and the like. In this example, a frame length may be 10 ms, thus, according to the TTI, TrCH#1 310 may include one frame and TrCH#2 320 and TrCH#3 330 may include two frames. The first frames of TrCH#2 320 and TrCH#3 330 may be marked as odd frames, and the second frames of TrCH#2 320 and TrCH#3 330 may be marked as even frames.

Although the scope of the present invention is not limited in this respect, a base address of a frame may be calculated according to the transport buffer size. In this example, a base address of TrCH#1 may be 0, a base address of TrCH#2's odd frame may be 50, a base address of TrCH#2's even frame may be 80, a base address of TrCH#3's odd frame may be 120, and a base address of TrCH#2's even frame may be 150. Furthermore, processor 260 may dynamically allocate the desired address range for channel buffer in the memory of receiver 200. Although the scope of the present invention is not limited in this respect, de-multiplexer 242 may de-multiplex symbols, for example, soft symbols, and may write the de-multiplexed soft symbols in a target address of channel buffer 250. Furthermore, processor 260 may calculate the target address of the de-multiplexed symbol, although the scope of the present invention is not limited in this respect.

Figure 4:
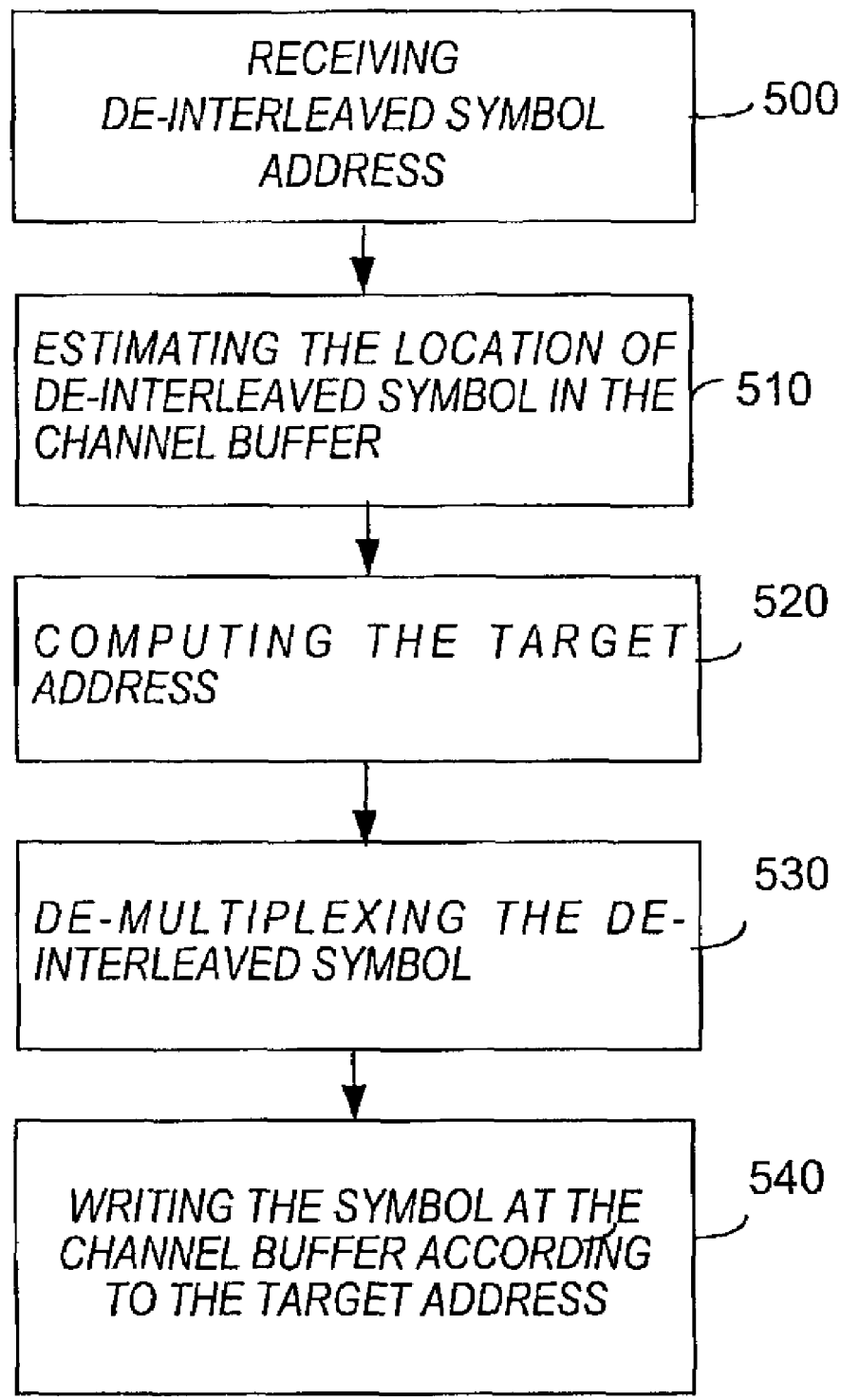
FIG. 4 is flow chart of a method according to some embodiments of the present invention.

Turning to FIG. 4, a method of writing de-multiplexed symbols of a de-interleaved frame according to some embodiments of the present invention will be described now. Although, the present invention is not limited in this respect, the method may start with receiving the symbol address from de-interleaver 241, for example the address may be 30 (block 500). The method may continue by estimating to which one of the transport channel buffers of channel buffer 300 the symbol may be written (block 510). For example, processor 260 may estimate whether or not the symbol may be written at TrCH#1 by performing the following test:

De-interleaved symbol address−TrCH#1 size<1

Furthermore, to estimate whether or not the symbol may be written at TrCH#2 the following test may be done:

De-interleaved symbol address−TrCH#1 size− TrCH#2<1.

In addition, to estimate whether or not the symbol may be written at TrCH#3 the following test may be done:

De-interleaved symbol address−TrCH#1 size−TrCH#2 size−TrCH#3 size <1.

Although the scope of the present invention is not limited in this respect, after determining to which transport channel buffer the symbol may be written, the target address of the symbol in transport channel buffer may be computed (block 520). For example, the target address for TrCH#1 may be computed according to the following equation:

Target Address=TrCH#1 base address+de-interleaved address.

Furthermore, the following equations may be used to compute the target address of the symbol in TrCH#2's odd frame, in TrCH#2's even frame, in TrCH#3's odd frame and in TrCH#2's even frame, if desired. For example, for TrCH#2's odd frame the target address may be:

Target Address=TrCH#2 base address+(de-interleaved address−TrCH#1 size);

for TrCH#2's even frame the target address may be:

Target Address=TrCH#2 even base address+(de-interleaved address−TrCH#1 size);

For example, for TrCH#3's odd frame the target address may be:

Target Address=TrCH#3 base address+(de-interleaved address−TrCH#1 size−TrCH#2 size);

for TrCH#3's even frame the target address may be:

Target Address=TrCH#3 even base address+(de-interleaved address−TrCH#1 size−TrCH#2 size);

However it should be understood by one skilled in the art that embodiments of the present invention are in no way limited to the above equations.

Although the scope of the present invention is not limited in this respect, the de-interleaved symbol may be de-multiplexed (block 530) and written to the appropriate transport channel buffer according to the above computed target address (block 540).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
   receiving a frame over a channel in a frame buffer;
   determining at least an indication of size of a de-interleaved symbol from the frame;
   de-multiplexing the de-interleaved symbol to provide a de-multiplexed symbol;
   computing a target address of the de-multiplexed symbol; and
   writing, by a processor, the de-multiplexed symbol in a channel buffer according to the target address;
   wherein the channel buffer comprises two or more transport channel buffers and computing the target address comprises:
      estimating in which one of the transport channel buffers the de-multiplexed symbol should be written, wherein the estimating comprises:
      inputting a size of at least one of the transport channel buffers;
      determining a difference between an address of the de-multiplexed symbol in the frame buffer and the size of at least one of the transport channel buffers; and
      comparing the difference with a threshold in order to estimate if the de-multiplexed symbol may be written at the at least one of the transport channel buffers.

2. The method of claim 1, further comprising:
   de-interleaving the frame to provide a base address of a transport channel buffer in the channel buffer.

3. The method of claim 2, wherein computing the target address comprises:
   adding an address of the de-multiplexed symbol to the base address.

4. An apparatus comprising:
   a frame buffer to receive a frame over a channel, wherein the frame includes a de-interleaved symbol;
   a de-multiplexer to de-multiplex directly from the received frame the de-interleaved symbol and to provide a de-multiplexed symbol;
   a channel buffer to store the de-multiplexed symbol, wherein the channel buffer comprises at least one transport channel buffer; and
   a processor configured to write the de-multiplexed symbol in the channel buffer according to a target address and to compute a size of the at least one transport channel buffer, the processor being further configured to determine at least an indication of size of the de-interleaved symbol from the frame;
   wherein the processor is configured to determine an address of the de-multiplexed symbol in the frame buffer and to estimate a base address of the at least one transport channel buffer in the channel buffer responsive to determining a difference between the address of the de-multiplexed symbol in the frame buffer and to compare the difference with a threshold in order to estimate if the de-multiplexed symbol may be written at the at least one of the transport channel buffers.

5. The apparatus of claim 4, further comprising:
   a de-interleaver to de-interleave the received frame.

6. The apparatus of claim 5, wherein the processor is configured to compute the target address of the symbol in the channel buffer.

7. The apparatus of claim 4, wherein the channel buffer comprises at least one transport channel buffer and the processor is configured to compute the size of the transport channel buffer.

8. The apparatus of claim 4, wherein the processor is a digital signal processor.

9. An apparatus comprising:
   a dipole antenna to receive data comprising at least one frame over a transport channel;
   a frame buffer to receive the at least one frame, wherein the frame includes a de-interleaved symbol;
   a de-multiplexer to de-multiplex directly from the received frame the de-interleaved symbol and to provide a de-multiplexed symbol;
   a channel buffer to store the de-multiplexed symbol; and a processor configured to write the de-multiplexed symbol in the channel buffer according to a target address;

wherein the channel buffer comprises at least one transport channel buffer and the processor is configured to compute the size of the at least one transport channel buffer, the processor being further configured to determine at least an indication of size of the de-interleaved symbol from the frame; and wherein the processor is configured to determine an address of the de-multiplexed symbol in the frame buffer and to determine a difference between the address of the de-multiplexed symbol in the frame buffer and a size of the at least one transport channel buffer and estimate a base address of the transport channel buffer in the channel buffer based upon the difference and to compare the difference with a threshold in order to estimate if the de-multiplexed symbol may be written at the at least one of the transport channel buffers.

10. The apparatus of claim 9, further comprising:
a de-interleaver to de-interleave the received frame.

11. The apparatus of claim 9, wherein the processor is a digital signal processor.

12. An article comprising: a computer readable storage medium having stored thereon instructions that when executed result in:
receiving a frame over a channel in a frame buffer;
determining at least an indication of size of a de-interleaved symbol from the frame;
de-multiplexing the de-interleaved symbol to provide a de-multiplexed symbol; computing, a target address of the de-multiplexed symbol; and
writing, by a processor, the de-multiplexed symbol in a channel buffer according to the target address;
wherein the channel buffer comprises two or more transport channel buffers and computing the target address comprises:
estimating in which one of the transport channel buffers the de-multiplexed symbol should be written, wherein the estimating comprises:
inputting a size of at least one of the transport channel buffers;
determining a difference between an address of the de-multiplexed symbol in the frame buffer and the size of at least one of the transport channel buffers; and
comparing the difference with a threshold in order to estimate if the de-multiplexed symbol may be written at the at least one of the transport channel buffers.

13. The article of claim 12, wherein the instructions when executed result in:
de-interleaving a frame received over a channel to provide a base address of a transport channel buffer in the channel buffer.

14. The article of claim 13, wherein the instructions when executed result in: adding an address of the de-multiplexed symbol to the base address.

* * * * *